(12) United States Patent
Bebon et al.

(10) Patent No.: US 12,066,024 B2
(45) Date of Patent: Aug. 20, 2024

(54) METHOD FOR CONTROLLING THE ROTATIONAL SPEED OF AN ELECTRIC MOTOR DRIVEN COMPRESSOR AND CONTROL UNIT ADAPTED TO PERFORM THE METHOD

(71) Applicant: VOLVO TRUCK CORPORATION, Gothenburg (SE)

(72) Inventors: Hugo Bebon, Vaulx en Velin (FR); Nathan Prod'Homme, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 174 days.

(21) Appl. No.: 17/753,381

(22) PCT Filed: Sep. 30, 2019

(86) PCT No.: PCT/EP2019/076378
§ 371 (c)(1),
(2) Date: Mar. 1, 2022

(87) PCT Pub. No.: WO2021/063471
PCT Pub. Date: Apr. 8, 2021

(65) Prior Publication Data
US 2022/0325714 A1 Oct. 13, 2022

(51) Int. Cl.
*F04C 25/00* (2006.01)
*F04B 49/06* (2006.01)
(Continued)

(52) U.S. Cl.
CPC ............ *F04C 28/08* (2013.01); *F04B 49/065* (2013.01); *F04B 49/20* (2013.01); *F04C 25/00* (2013.01);
(Continued)

(58) Field of Classification Search
CPC ........ F04B 49/02; F04B 49/022; F04B 49/06; F04B 49/065; F04B 49/08; F04B 49/20;
(Continued)

(56) References Cited

U.S. PATENT DOCUMENTS

2008/0206070 A1   8/2008  Kley et al.
2015/0176575 A1*  6/2015  Nemeth ............... F04B 49/022
                                                    417/34

FOREIGN PATENT DOCUMENTS

CN    103502601 A    1/2014
CN    104736403 A    6/2015
(Continued)

OTHER PUBLICATIONS

International Search Report and Written Opinion dated Jun. 12, 2020 in corresponding International PCT Application No. PCT/EP2019/076378, 12 pages.
(Continued)

*Primary Examiner* — Philip E Stimpert
(74) *Attorney, Agent, or Firm* — Venable LLP; Jeffri A. Kaminski

(57) ABSTRACT

A method for controlling the rotational speed (S) of an electric motor driven air compressor (2) that supplies compressed air to a pneumatically operated system (5) of a vehicle (1), characterized by the preliminary steps of: a) determining the efficiency (e) of the air compressor (2) for different values (Si) of the rotational speed (S) of the air compressor (2), the efficiency (e) of the air compressor (2) corresponding to the ratio between the pneumatic power (PI) produced by the air compressor (2) and the power (PO) given to the air compressor (2); b) determining one or several specific values (S2, S4) among said different values (Si), for which the efficiency (e) of the air compressor (2) is
(Continued)

higher than a threshold value (emin) and/or comparatively higher than those determined for values (SI, S3) close to said specific value(s) (S2, S4); the preliminary steps a) and b) being preferably implemented only once; and characterized by the further repetitive steps of: c) determining the air consumption rate of the pneumatically operated system (5) receiving compressed air from the air compressor (2); d) determining a minimum rotational speed (Smin) of the air compressor (2) to obtain an air production rate of the air compressor (2) that is equal or substantially equal to said determined air consumption rate; e) determining if the specific value or one of the specific values (S2, S4) is greater than said determined minimum rotational speed (Smin); f) if no specific value is greater than said determined minimum rotational speed (Smin), controlling the rotational speed (S) of the air compressor (2) based on said minimum rotational speed (Smin); g) if only one specific value (S4) is greater than said determined minimum rotational speed (Smin), controlling the rotational speed (S) of the air compressor (2) based on said only one specific value (S4); h) if a plurality of specific values (S2, S4) is greater than said determined minimum rotational speed (Smin), determining the specific value (S2) with the best efficiency among said plurality of specific values (S2, S4) and controlling the rotational speed (S) of the air compressor (2) based on said specific value (S2) with the best efficiency.

7 Claims, 1 Drawing Sheet

(51) Int. Cl.
*F04B 49/20* (2006.01)
*F04C 28/08* (2006.01)

(52) U.S. Cl.
CPC ...... *F04C 2240/40* (2013.01); *F04C 2270/02* (2013.01); *F04C 2270/0525* (2013.01)

(58) Field of Classification Search
CPC ............... F04B 27/004; F04B 49/00; F04C 2270/0525; F04C 2270/02; F04C 2240/40; F04C 25/00; F04C 28/08
See application file for complete search history.

(56) References Cited

FOREIGN PATENT DOCUMENTS

| | | |
|---|---|---|
| CN | 105934584 A | 9/2016 |
| CN | 106794831 A | 5/2017 |
| CN | 110030081 A | 7/2019 |
| DE | 102008006860 A1 | 8/2009 |
| DE | 102012223158 A1 | 6/2014 |
| DE | 102013003513 A1 | 9/2014 |
| EP | 3015328 A1 | 5/2016 |
| EP | 3364035 A1 | 8/2018 |
| WO | 2018184849 A1 | 10/2018 |

OTHER PUBLICATIONS

Chinese Office Action dated Jan. 2, 2024 in corresponding Chinese Patent Application No. 201980100239.7, 14 pages.

* cited by examiner

METHOD FOR CONTROLLING THE ROTATIONAL SPEED OF AN ELECTRIC MOTOR DRIVEN COMPRESSOR AND CONTROL UNIT ADAPTED TO PERFORM THE METHOD

CROSS-REFERENCE TO RELATED APPLICATIONS

This application is a U.S. National Stage application of PCT/EP2019/076378, filed Sep. 30, 2019 and published on Apr. 8, 2021, as WO 2021/063471 A1, all of which is hereby incorporated by reference in its entirety.

TECHNICAL FIELD

The invention relates to a method for controlling the rotational speed of an electric motor driven air compressor.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and passenger cars. The invention may also be used on other transportation means such as ships and boats.

BACKGROUND

In heavy-duty vehicles, pneumatically operated systems, such as braking systems, are powered by compressed air produced by air compressors.

On conventional trucks, air compressors are generally driven by internal combustion engines. In this case, the air compressor speed depends on the speed of the internal combustion engine, which may lead to a non-regular production of compressed air. As the compressor is driven by the ICE, compressor speed cannot be controlled, thus the compressor can run at speed where efficiency is low and energy is wasted.

In hybrid or electric vehicles, such a problem is avoided due to the fact that the air compressor is driven by an electric motor that is independent of the motor propelling the vehicle.

However, such electric motor driven air compressor are very consumer in term of energy.

SUMMARY

An object of the invention is to provide a method for controlling the rotational speed of an electric motor driven air compressor, which method allows saving significant energy.

The object is achieved by a method according to claim 1. Thus, the object is achieved by a method for controlling the rotational speed of an electric motor driven air compressor that supplies compressed air to a pneumatically operated system of a vehicle, characterized by the preliminary steps of:
  a) determining the efficiency of the air compressor for different values of the rotational speed of the air compressor, the efficiency of the air compressor corresponding to the ratio between the pneumatic power produced by the air compressor and the power given to the air compressor;
  b) determining one or several specific values among said different values, for which the efficiency of the air compressor is higher than a threshold value and/or comparatively higher than those determined for values close to said specific value(s);

the preliminary steps a) and b) being preferably implemented only once; and characterized by the further repetitive steps of:
  c) determining the air consumption rate of the pneumatically operated system receiving compressed air from the air compressor;
  d) determining the minimum rotational speed of the air compressor to obtain an air production rate of the air compressor that is equal or substantially equal to said determined air consumption rate;
  e) determining if a specific value is greater than said determined minimum rotational speed;
  f) if no specific value is greater than said determined minimum rotational speed, controlling the rotational speed of the air compressor based on said minimum rotational speed;
  g) if only one specific value is greater than said determined minimum rotational speed, controlling the rotational speed of the air compressor based on said only one specific value;
  h) If a plurality of specific values are greater than said determined minimum rotational speed, determining the specific value with the best efficiency among said plurality of specific values and controlling the rotational speed of the air compressor based on said specific value with the best efficiency.

Thus configured, the method of the present invention permits to drive the air compressor at its best efficient speed for which the efficiency of the air compressor is the highest possible.

According to further aspects of the invention, the object is achieved by a control unit according to claim 6 and a vehicle according to claim 7.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
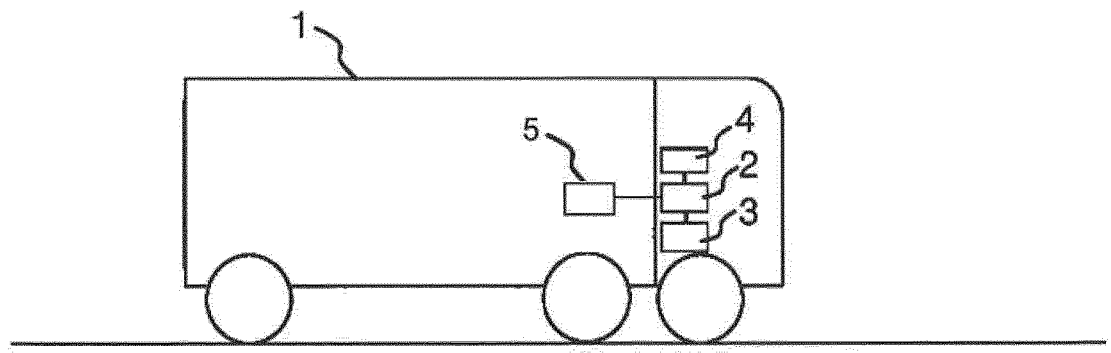
FIG. 1 is a schematic side view of a vehicle according to the invention.

FIG. 1 shows a vehicle 1 in the form of a truck in a schematic side view. The vehicle 1 comprises an electric motor 4, a pneumatically operated system 5, an air compressor 2 driven by the electric motor 4, the air compressor 2 supplying compressed air to the pneumatically operated system 5, and a control unit 3 for controlling the rotational speed of the electric motor driven air compressor 2.

The vehicle 1 may be an electrical vehicle or a hybrid vehicle that comprises at least one electric motor 4. The vehicle 1 may comprise one or several batteries to power the electric motor 4.

The vehicle 1 comprises one or several pneumatically operating systems 5, for example one or several braking systems, a parking system, an air suspension system, a system for an attached trailer or for other accessory systems. Each pneumatically operating system 5 is supplied with compressed air produced by the air compressor 2.

The air compressor 2 is for example a screw compressor or a vane compressor. The air compressor 2 is driven by the electric motor 4 via a transmission. The electric motor 4 cannot be the same electric motor that is arranged to propel the vehicle 1.

The control unit 3 is adapted to control the rotational speed S of the air compressor 2. This control may for example consist in controlling the transmission means, e.g. a shaft, which transmits the torque from the electric motor 4 to the air compressor 2. In another embodiment, the control unit 3 may also be configured to control the speed of the electric motor 4.

The control unit 3 may be included into, or may receive signals and data from, an Electronic Control Unit of the vehicle 1. In particular, the control unit 3 may receive data relative to the pneumatic power P1, corresponding to the amount of compressed air, produced by the air compressor 2, and the power P0 given to the air compressor 2 by the electric motor 4. The control unit 3 may also include a processor and a memory. Thus, the control unit 3 may be adapted to perform mathematic operation between said data and store the result in its memory.

In particular, the control unit 3 can determine the working performance of the air compressor 2 for several operating speed Si thereof. The working performance can be determined by a parameter e, called "efficiency", which corresponds to the ratio between the pneumatic power P1 and the power P0:

$$e = P1/P0.$$

By comparing the efficiency e for each operating speed Si to a threshold value emin, the control unit 3 may firstly determine optimal speeds among said operating speeds Si, for which the efficiency e is higher than said threshold value emin. The control unit 3 may secondly determine one or several specific speed among said optimal speeds for which the efficiency e is comparatively higher than those determined for optimal speeds close to said specific speed(s). These determined specific speeds may thus be stored in the memory of the control unit 3.

The control unit 3 may advantageously implement the above-mentioned preliminary steps, preferably only once, before repetitively implementing the further successive steps of the method of the present invention. During the implementation of these preliminary steps, the number of operating speeds Si may vary, but may preferably be greater than four. In the specific case of a truck, these operating speeds Si may advantageously be greater than 500 rpm and lower than 5000 rpm.

In the next step, the control unit 3 determines the air consumption rate of the pneumatically operated system(s) 5 receiving compressed air from the air compressor 2. This air consumption rate may be determined, for example, by measuring the outflow rate from a tank receiving the compressed air produced by the air compressor 2.

In the next step, the control unit 3 determines the minimum rotational speed Smin of the air compressor 2 to obtain an air production rate of the air compressor 2 that is equal or substantially equal to said determined air consumption rate. The air production rate of the air compressor 2 being generally proportional to the rotational speed S of the air compressor 2, Smin may be determined by calculating or estimating the rotational speed S producing the desired air production rate.

In the next step, the control unit 3 determines if one or several speeds among the specific speeds determined during the preliminary steps are greater than said minimum rotational speed Smin. If no specific speed is greater to Smin, the control unit 3 may control the rotational speed S of the air compressor 2 based on said minimum rotational speed Smin. If only one specific speed is greater than Smin, the control unit 3 may control, in the next step, the rotational speed S of the air compressor 2 based on said only one specific speed. If a plurality of specific speeds are greater than Smin, the control unit 3 may determine the specific speed with the best efficiency among said plurality of specific speeds and may control, in the next step, the rotational speed S of the air compressor 2 based on said specific speed with the best efficiency.

Figure 2:
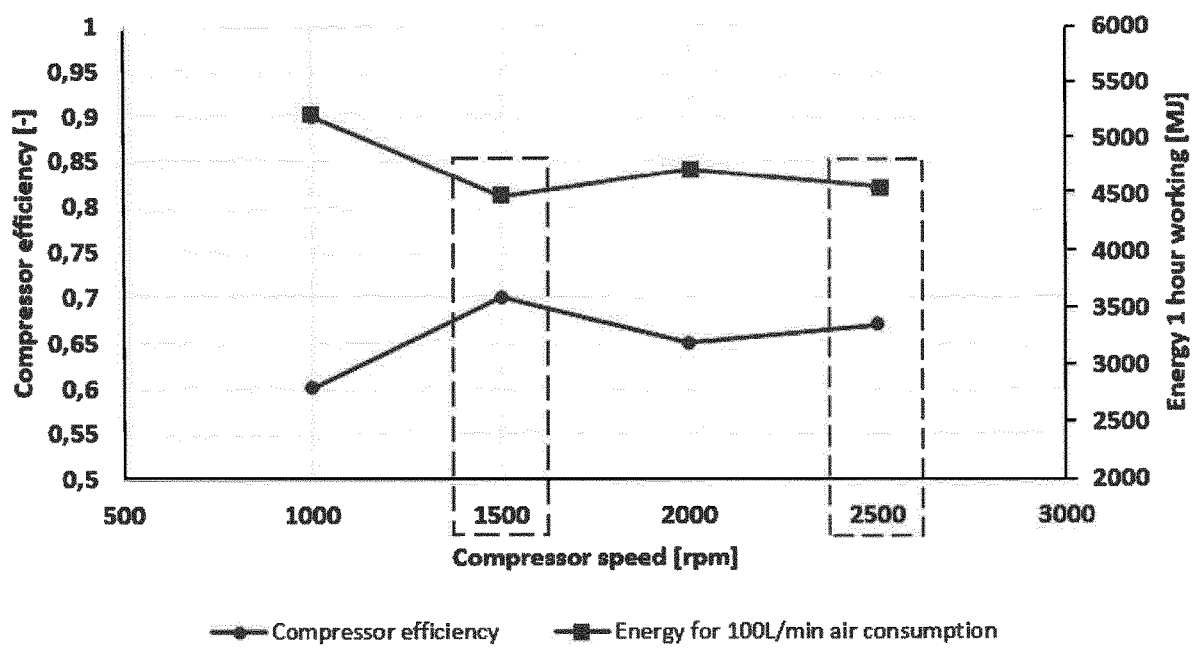
FIG. 2 is a diagram showing the variations of the efficiency of the air compressor of the vehicle of FIG. 1 and of the energy consumption thereof for several rotational speeds of the air compressor.

The diagram of FIG. 2 illustrates the working performance of the air compressor 2 for four operating speeds S1-S4, respectively equal to 1000, 1500, 2000 and 2500 rpm. For each operating speed, the control unit 3 has determined the efficiency e of the air compressor 2 and the energy consumption during one hour of working and for an air consumption rate of 170 L/min. The results are provided in the following table.

|  | Operating Speed | | | |
| --- | --- | --- | --- | --- |
|  | S1 = 1000 rpm | S2 = 1500 rpm | S3 = 2000 rpm | S4 = 2500 rpm |
| Efficiency e | 0.6 | 0.7 | 0.65 | 0.67 |
| Energy consumption (en MJ) | 5200 | 4500 | 4800 | 4600 |

Based on said results, the control unit 3 has determined two specific speeds, respectively S2 and S4, for which the efficiency e is higher than 0.6 and comparatively higher than the efficiency e determined for the speed S1 and S3. At these specific speeds, the energy consumption is also comparatively lower than the energy consumption determined for the speed S1 and S3. These specific speeds S2 and S4 correspond to optimal operating speeds for the air compressor 2 for which the energy saving is the greatest.

Therefore, when the control unit 3 determines that the air consumption rate sets a minimum operating speed Smin that is equal to S1, it controls the rotational speed S of the air compressor 2 to set it to the specific value S2 for which the efficiency e is comparatively higher, and thus the energy consumption is comparatively lower, than the one determined for S1.

When the control unit 3 determines that the air consumption rate sets a minimum operating speed Smin that is equal to S3, it controls the rotational speed S of the air compressor 2 to set it to the specific value S4 for which the efficiency e is comparatively higher, and thus the energy consumption is comparatively lower, than the one determined for S3.

It is to be understood that the present invention is not limited to the embodiments described above and illustrated in the drawings; rather, the skilled person will recognize that many changes and modifications may be made within the scope of the appended claims.

The invention claimed is:
1. A method for controlling the rotational speed of an electric motor driven air compressor that supplies com- pressed air to a pneumatically operated system of a vehicle, the method comprising the preliminary steps of:

a) determining an efficiency of the air compressor for different values of the rotational speed of the air compressor, the efficiency of the air compressor corresponding to a ratio between the pneumatic power produced by the air compressor and the power given to the air compressor;

b) determining one or several specific values among said different values, for which the efficiency of the air compressor at the corresponding rotational speed is higher than a threshold value and/or comparatively higher than those determined for values close to said specific value(s); and further comprising the further repetitive steps of:

c) determining an air consumption rate of the pneumatically operated system receiving compressed air from the air compressor;

d) determining a minimum rotational speed of the air compressor to obtain an air production rate of the air compressor that is equal to said determined air consumption rate;

e) determining if a specific value or specific values is or are than said determined minimum rotational speed (Smin);

f) controlling the rotational speed of the air compressor based on said minimum rotational speed when no specific value is greater than said determined minimum rotational speed;

g) controlling the rotational speed of the air compressor based on one specific value when only said one specific value is greater than said determined minimum rotational speed;

h) determining the specific value with the best efficiency among said plurality of specific values and controlling the rotational speed of the air compressor based on said specific value with the best efficiency when a plurality of specific values are greater than said determined minimum rotational speed.

2. The method according to claim 1, wherein the threshold value is equal to 0.6.

3. The method according to claim 1, wherein the efficiency of the air compressor is determined at step a) for at least four values of the rotational speed of the air compressor.

4. The method according to claim 3, wherein the values of the rotational speed are greater than 500 rpm and lower than 5000 rpm.

5. The method according to claim 1, wherein the pneumatically operated system is chosen among a braking system, an air conditioning system, a parking system, a suspension system.

6. A control unit for controlling the rotational speed of an electric motor driven air compressor, the control unit being adapted to perform the steps of the method according to claim 1.

7. A vehicle comprising an electric motor, a pneumatically operated system, an air compressor driven by the electric motor and supplying compressed air to the pneumatically operated system and a control unit according to claim 6.

* * * * *